United States Patent [19]
Mori

[11] 4,343,998
[45] Aug. 10, 1982

[54] METHOD AND APPARATUS FOR DETECTING SEWING DEFECTS ON A STOCKING TOE CLOSER

[75] Inventor: Sukeo Mori, 17-2, Zeze 1-chome, Otsu-shi, Singa-ken, Japan

[73] Assignee: Sukeo Mori, Japan

[21] Appl. No.: 124,540

[22] Filed: Feb. 25, 1980

[30] Foreign Application Priority Data

Feb. 23, 1979 [JP] Japan ................................ 54-020963

[51] Int. Cl.³ .............................................. G01N 21/88
[52] U.S. Cl. ...................................... 250/563; 250/572
[58] Field of Search ................ 112/272, 277; 250/561, 250/562, 563, 223 B, 560, 572; 356/430, 431

[56] References Cited

U.S. PATENT DOCUMENTS

| | | | |
|---|---|---|---|
| 2,812,447 | 11/1957 | Mac Martin et al. | 250/563 |
| 3,436,555 | 4/1969 | Foster | 250/223 B |
| 3,588,513 | 6/1971 | Takatsuki | 250/562 |
| 3,812,348 | 5/1974 | Lippke | 250/561 |
| 4,258,267 | 3/1981 | Feldkamper | 250/560 |

*Primary Examiner*—David C. Nelms
*Attorney, Agent, or Firm*—Lerner, David, Littenberg & Samuel

[57] ABSTRACT

Three sets of photoelectric sensors are arranged either in combination or solely re the path of travel of the toe section of a closed stocking on a sewing machine in order to detect presence of sewing defects such as skip sewing, spot sewing and/or foreign material inclusion. Accidental supply of stockings with sewing defects to market is well prevented in a completely automatic manner without any substantial rise in production cost.

6 Claims, 11 Drawing Figures

Fig. 7
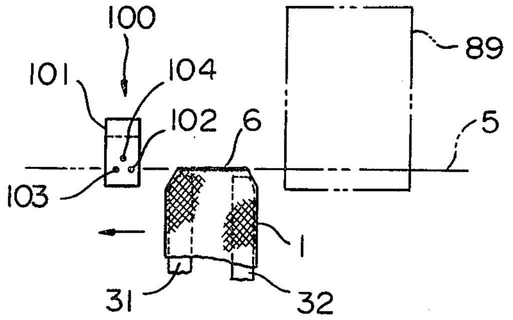
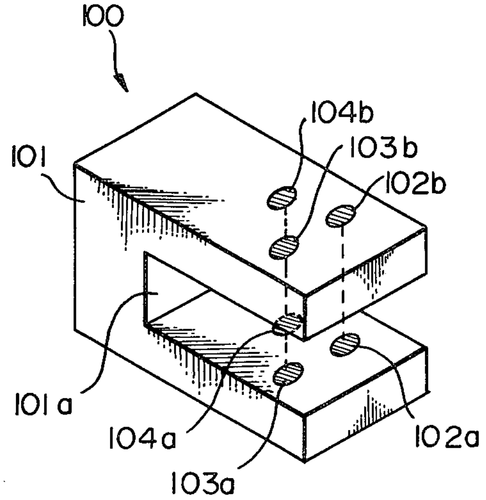
Fig. 8
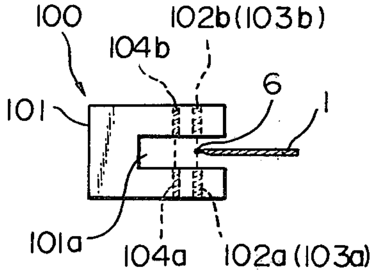
Fig. 9

METHOD AND APPARATUS FOR DETECTING SEWING DEFECTS ON A STOCKING TOE CLOSER

BACKGROUND OF THE INVENTION

The present invention relates to improved method and apparatus for detecting sewing defects on a stocking toe closer, and more particularly relates to improvement in photoelectric detecting system of sewing defects, on an automatic stocking tow closer, such as skip sewing caused by thread breakage or abnormal engagement of a sewing needle with a thread, spot sewing caused by ill supply of the material, and foreign material inclusion.

On a known automatic stocking toe closer, automatic closing of the toe section of a stocking by sewing in general includes the following operational steps.

(i) In the first step, the welt section of a cylindrical material stocking is held by an operator and pneumatically sucked into a suction pipe with its toe section being on the leading side.

(ii) In the second section, the pneumatic suction is interrupted and the welt section is placed over the end portion of the suction pipe. The remnant of the material stocking is positively and automatically rolled up in order to place the stocking inside out. The toe section to be closed is, however, left outside the suction pipe.

(iii) In the third step, a pair of finger pieces annexed to the suction pipe is moved from each other in order to laterally stretch the toe section to be closed. Thereafter, the finger pieces holding the material stocking advance towards a sewing machine.

(iv) The finger pieces holding the material stocking are moved laterally across the sewing position on the sewing machine so that a sew line is formed by the sewing machine along the fringe of the toe section.

(v) In the fifth step, the finger pieces holding the toe-closed stocking recede from the sewing position and the stocking is returned to the original state. Thereupon, the pneumatic section is resumed in order to pass the complete stocking to the next operational station via the suction pipe.

No detection of the sewing result is included in the above-described process and the complete stockings are pneumatically passed to the next operational station whilst possibly containing some sewing defects. Operational troubles may often occur during sewing process whilst resulting in serious defects in the products, which considerably degrades the commercial value of the product and, when supplied on market, seriously blemishes the reputation of the producer.

Conventionally, detection of such sewing defects is carried out depending on visual inspection by the operators involved in the toe-closing process or by operators in the subsequent process or processes. This manual detection system requires increased labour and elongated operation time, both connecting to undesirable rise in production cost of stockings.

SUMMARY OF THE INVENTION

It is the basic object of the present invention to greatly streamline the inspection of sewing defects in toe-closing of stockings.

It is another object of the present invention to carry out inspection of sewing defects on toe-closed stockings in a fully automatic fashion without any increase in the operation time.

It is the other object of the present invention to supply stockings of good quality only without any substantial rise in production cost.

In accordance with the basic aspect of the present invention, at least one photoelectric sensor is place in the travelling path of the fringe of the toe section on the downstream side of the sewing position on a sewing machine in order to detect the presence and the type of any sewing defect on the basis of change in light quantity reseived by the sensor.

BRIEF DESCRIPTION OF DRAWINGS

FIG. 7 is a plan view of one embodiment of the sewing defect detecting apparatus in accordance with the present invention and its related parts, FIG. 8 is a prespective view of the detecting apparatus shown in FIG. 7, FIG. 9 is a side, partly in section, of the detecting apparatus shown in FIG. 7.

DESCRIPTION OF THE PREFERRED EMBODIMENT

Figure 1:
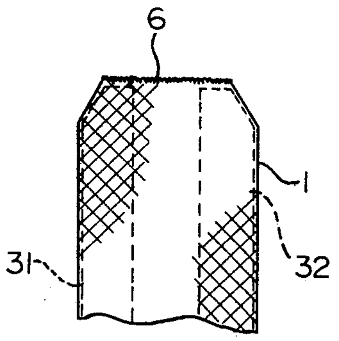
FIGS. 1 through 4 are plan views of various sewing defects appearing on the fringe of a toe section, FIG. 5 a plan view of a holding assembly for stocking materials on an automatic toe closer.
Figure 2:
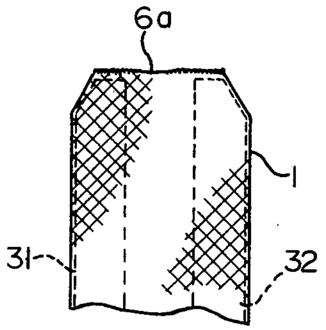
Figure 3:
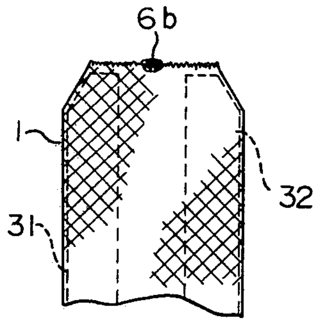
Figure 4:
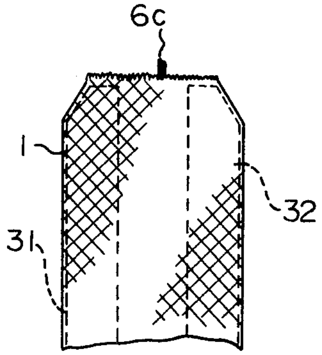

The stocking 1 shown in FIG. 1 includes no sewing defect and is provided with a normal sew line 6. The stocking 1 shown in FIG. 2 includes a first sort of sewing defect **6*a*, skip sewing, which is caused by thread breakage or abnormal engagement of the sewing needle with the sewing thread during the sewing operation. The stocking 1 shown in FIG. 3 includes a second sort of sewing defect 6*b*, spot sewing, which is caused by abnormal supply of the stocking material across the sewing position due to ill adjustment of the supply gear of the sewing machine. The stocking material 1 shown in FIG. 4** includes a third sort of sewing defects, foreign material inclusion, which in general projects out of the fringe of the closed toe section. Presence of any yarn end or material cut piece in the proximity of the sewing line before sewing after causes formation of such a sewing defects.

Figure 5:
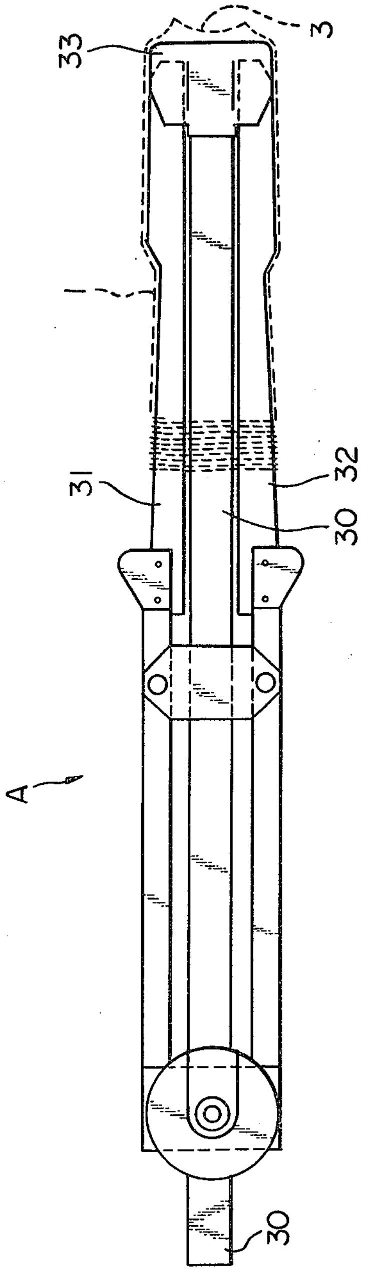

Before sewing, a material stocking 1 has to be held by a holding assembly shown in FIG. 5, which includes a pair of movable finger pieces 31 and 32 accompanying a suction pipe 30. The finger pieces 31 and 32 are arranged on both lateral sides of the suction pipe 30 and coupled to the section pipe 30 so that their front ends are movable away from and towards each other. The construction for driving the finger pieces 31 and 32 tor such a movement is disclosed in detail in U.S. Pat. Nos. 3,941,069 and 3,952,673, respectively. The material stocking 1 is held by the finger pieces 31 and 32 in such a manner that its toe section 3 partly extends beyond the front end 33 of the suction pipe 30. The finger pieces 31 and 32 is movable in the longitudinal direction with respect to the suction pipe 30 also.

Figure 6:
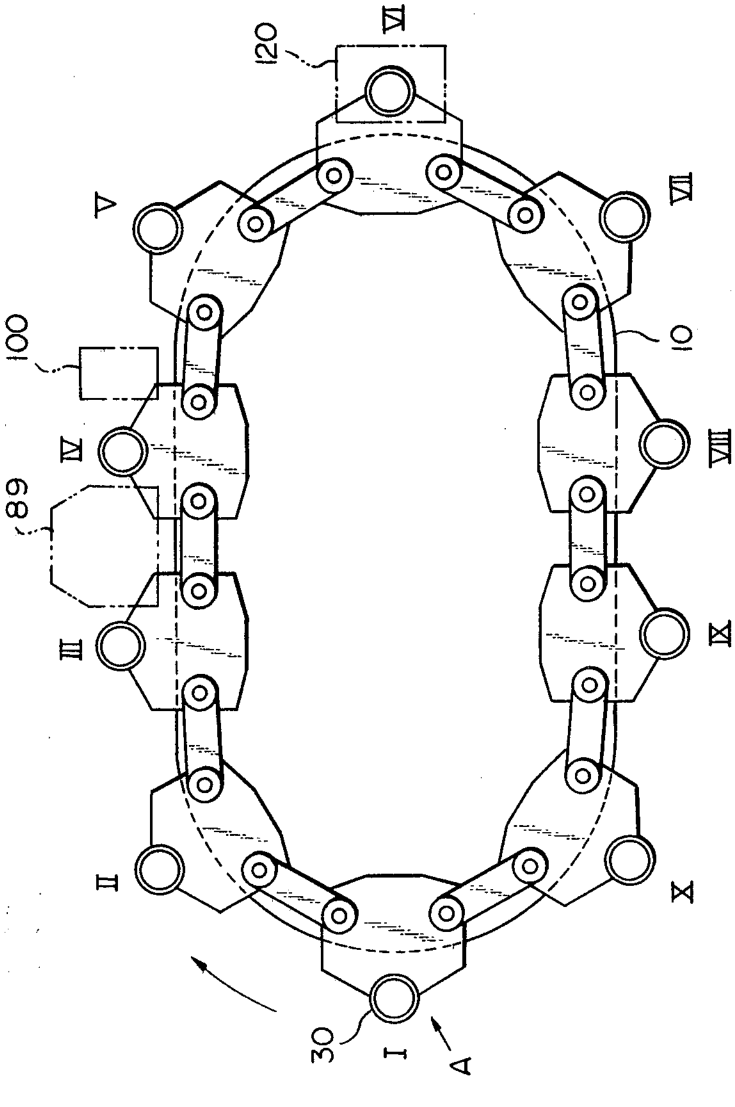
FIG. 6 is a plan view of the rough entire construction of the automatic toe closer.

General entire construction of the automatic toe to closer is shown in FIG. 6, in which a plurality of holding assemblies A are linked to each other in an endless fashion at equal intervals on an oblong pedestal 10. The holding assemblies A are driven for circulation along an endless path of travel fixed on the pedestal 10 either continuously or intermittently. Ten stations I through X are chosen at equal intervals on the above-described endless path of travel. Closing of the toe section of a material stocking 1 is carried out within one complete circulation of the material stocking 1 on a holding assembly A.

As the holding assembly A travels from station I to station II, the above-described first and second step operations are carried out in order to put the material stocking in the state shown in FIG. 5. During travel of the holding assembly A from station II to station III, the third step operation is carried out so that the toe section 3 is registered at the straight sewing line 5 on the sewing machine 89. During the period of travel from station III to station IV, the fourth step operation is completed so that a straight sew line 6 is formed on the toe section 3 (see FIG. 1) by the sewing machine 89.

The detecting apparatus 100 in accordance with the present invention is arranged at a proper position between the stations IV and V, i.e. on the downstream side of the sewing machine 89, in order to detect possible sewing defect on the toe section 3. As the holding assembly A travels from station V to station VI, the finger pieces are made to recede from the advanced position by means of a suitable spring mechanism (not shown) while their front ends move towards each other.

A removing assembly 120 is arranged at a proper position between the stations VI and VII so that stockings with sewing defects should be taken off the suction pipe 30 and discharged outside the toe closer. Stockings with normal sew lines pass by this position without such discharge, whilst still being held on the associated suction pipes 30. At any selected position between the stations VII and X, pneumatic suction is applied to the toe-closed stocking on the associated holding assembly so that the stocking is pneumatically and positively passed to the next operational station via the suction pipe 30. Thus, one cycle of toe-closing operation is completed.

In accordance with the present invention, the detecting apparatus 100 generates an electric detection signal upon detection of any sewing defect 6*a*, 6*b* or 6*c* on the closed toe section, which is passed to the removing assembly 120 for its operation with a prescribed time-lag. When the toe section includes a normal sew line, no detection signal is generated by the detecting apparatus.

The construction of the detecting apparatus 100 is shown in detail in FIGS. 7, 8 and 9.

As described already, the sewing machine 89 is arranged at a proper position between the stations III and IV on the pedestal 10 and a bracket 101 having a horizontal transverse slit 101*a* is arranged laterally on the downstream side of the sewing machine 89. The path of travel of the sew line on the closed toe section passes through the slit 101*a* in the bracket 101.

Three sets of photoelectric sensors 102, 103 and 104 are arranged on the bracket. Each photoelectric sensor, say the sensor 102, includes a light emitter 102*a* in the form of an infrared light emission diode and a light receiver 102*b* in the form of a photoelectric transistor. The light emitter 102*a* is arranged within one branch of the bracket 101 and the light receiver 102*b* is arranged in another branch of the bracket 101 in axial alignment with the light emitter 102*a*. The beam emitted by the light emitter 102*a* travels vertically through the slit 101*a* in the bracket 101 and arrives the light receiver 102*b* which thereupon generates an electric detection signal corresponding to the quantity of the incedent light. The other sensors 103 and 104 are substantially common in construction and function to the above-described photoelectric sensor 102.

The three sets of photoelectric sensors 102, 103 and 104 are arranged on the bracket 101 as best seen in FIG. 7. The sensors 102 and 103 are adapted for detection of skip sewing defects 6*a* and spot sewing defects 6*b* and both arranged on the extension of the straight sewing line on the sewing machine 89. The sensor 104 is adapted for detection of foreign material inclusion defects 6*c* and arranged at a position forwardly beyond the above-described extention.

The sensors 102 and 103 are electrically connected to a suitable known control circuit (not shown) which generates an electric operation signal when there is any difference between detection signals from these sensors 102 and 103. The sensor 104 is also electrically coupled to a suitable known control circuit (not shown) which generates an electric operation signal when any change occurs in the detection signals from the sensor 104. These control circuits are both electrically connected to the removing assembly 120 in order to drive same for the prescribed operation with a time-lag when any sewing defect is detected by any of the sensorss 102, 103 and 104.

So that the first and second sensors 102 and 103 function only when the seam line 6 on the closed toe section 3 is registered at the correct position in the detection area, suitable known limit switches are attached to the apparatus in order to sense the correct registration of the seam line 6.

Figure 10:
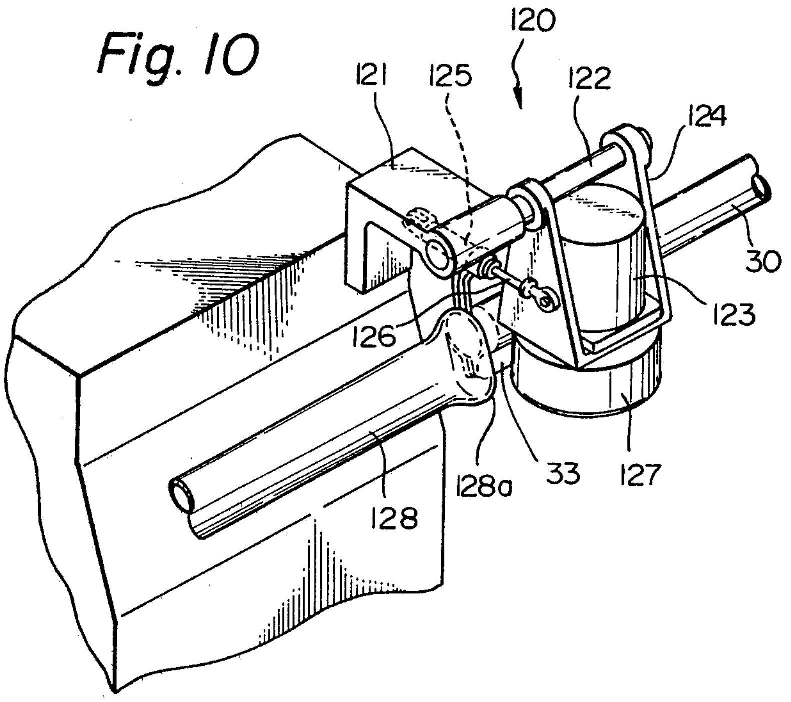
FIG. 10 is a perspective view of the removing assembly advantageously usable in combination with the detecting apparatus in accordance with the present invention.
Figure 11:
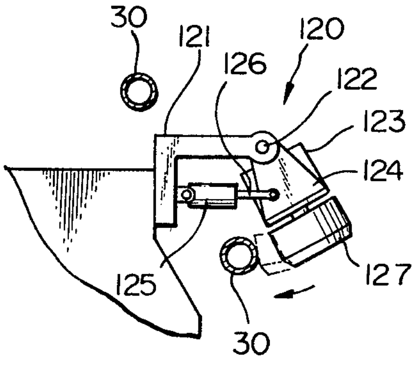
FIG. 11 is a partly omitted side view of the removing apparatus shown in FIG. 10.

The construction of the removing assembly 120 arranged at a position between the stations VI and VII is shown in detail in FIGS. 10 and 11.

An L-shaped bracket 121 is secured to the framework of the apparatus by means of its vertical branch and its horizontal branch carries a stationary shaft 122 which extends horizontally. This shaft 122 swingably carries an arm bracket 124 on which a drive motor 123 is securedly mounted. An air cylinder 125 extend substantially in parallel to the horizontal branch of the bracket 121 with its tail end being pivotted to the vertical branch of the bracket 121. The front end of a piston 126 of the air cylinder 125 is pivoted to one side of the arm bracket 124. The output shaft of the drive motor 123 fixedly carries a delivery roller 127 which rotates in the direction of an arrow in FIG. 10.

The delivery roller 127 is located at a position able to contact the top face of the front end 33 of the suction pipe 30. The delivery roller 127 is brought to the operative position shown with dot lines from the inoperative position shown with solid lines in FIG. 11 by operation of the air cylinder 125 via the piston 126. When registered at the operative position, the delivery roller 127 comes into contact with the top face of the front end 33 of the suction pipe 30 and is, thereupon, driven for rotation.

A pneumatic suction tube 128 is arranged so that its funnel-shaped mouth 128*a* faces the path of travel of the front end 33 of the suction pipe 30 on the holding assembly A.

The detecting apparatus 100 in accordance with the present invention and the above-described removing assembly 120 cooperate as follows. When any sewing defect is detected on a closed toe section by the detecting apparatus 100, a corresponding operation signal is passed with prescribed time-lag to the removing assembly 120 so that the latter discharges the stocking outside the automatic toe closer.

When a toe section 3 with a normal sew line 6 passes through the detection area in the slit 101*a* of the bracket 101, there is no difference in quantity of the incedent light between the sensor 102 and 103 and, consequently, detection signals from these sensors 102 and 103 are same in magnitude. No operation signal is generated by the control circuit and the removing assembly does not operate at all. The stocking with the normally closed toe section is discharged outside the toe closer via the suction pipe 30 during its subsequent travel from station VII to station X.

Assuming that a closed toe section 3 including a skip sewing defect 6*a* enters the detection area of the apparatus, the beam from the light emitter 102*a* of the first sensor 102 fully arrives at the light receiver 102*b* without interruption because of absence of the sew line 6. Whereas, the beam from the light emitter 103*a* of the second sensor 103 is more or less interrupted by the normal seam line 6 on the closed toe section 3. This difference in quantity of incident light makes the two light receivers 102*b* and 103*b* generate detection signals different in magnitude. Then, the common control circuit generates an operation signal in order to cause the delayed operation of the removing assembly 120.

Assuming that a closed toe section 3 including a spot sewing defect 6*b* enters the detection area of the apparatus, the beam from the light emitter 102*a* of the first sensor 102 is more interrupted by the defect 6*b* which is thicker than the normal sew line 6. Whereas the beam from the light emitter 103*a* of the second sensor 103 is less interrupted by the normal sew line 6. This difference in quantity of incident light again makes the two light receivers 102*b* and 103*b* generate detection signals different in magnitude. Consequently, the common control circuit again generates an operation signal in order to cause the delayed operation of the removing assembly 120.

When a closed toe section with normal sew line passes through the detection area of the apparatus, the beam from the light emitter 104*a* of the third sensor 104 fully arrives at the light receiver 104*b* which thereupon generates a detection signal of such and such a magnitude. Assuming that a closed toe section 3 including a foreign material inclusion defect 6*c* passes through the detection area of the apparatus, the beam from the light emitter 104*a* is more or less interrupted by the projecting defect 6*c* and, consequently, the light receiver 104*b* generates a detection signal whose magnitude is smaller than the above-described such and such a magnitude. This difference in detection signal makes the associated control circuit generate an operation signal in order to cause the delayed operation of the removing assembly 120.

In any of the foregoing three cases, the removing assembly starts its operation with prescribed time-lag upon receipt of the operation signal from the detecting apparatus.

At a prescribed timing after receipt of the operation signal, the drive motor 123 starts to rotate the delivery roller 127. Next, the air cylinder 125 starts to shift the rotating delivery roller 127 from the inoperative to operative position in order to bring the delivery roller 127 into rolling contact with the top face of the front end 33 of the suction pipe 30. This rolling contact rolles back the stocking on the suction pipe 30 and remove it off the suction pipe 30. The removed stocking is then discharged outside the automatic toe closer via the suction tube 128.

In a preferred modification of the present invention, a further additional pneumatic suction tube may be arranged in the proximity of the detection area with its mouth facing the fringe of the travelling toe section in order provisionally keep the foreign material inclusion defect in a posture (substantially horizontal) adapted for successful detection by the third sensor 104.

In the foregoing description, the present invention is applied to an automatic toe closer for stockings. It should be understood, however, that the present invention is well applicable, with some modifications known to anyone skilled in the art, to different type of sewing machines.

Although, three sets of photoelectric sensors are used in combination in the case of the illustrated embodiment, detection of sewing defect can be well carried out in accordance with the present invention by using one photoelectric sensor only, if some suitable modification is applied to the associated control circuit.

Assuming that detection of only skip and/or spot sewing is required, there is no need for provision of the third photoelectric sensor 104. Whereas, when detection of only foreign material inclusion is required, there is no need for provision of the first and second photoelectric sensors 102 and 103. Detection of skip and/or spot sewing can be carried out by one sensor only, should the associated control circuit be able to generate an operation signal when any change occurs in the input detection signal.

I claim:

1. Improved apparatus for detecting sewing defects on a stocking toe closer comprising a pair of photoelectric sensors arranged at spaced positions to define a detection area, said detection area aligned along the path of travel of the sew line on the toe section of a stocking, each of said photoelectric sensors including a light emitter arranged on one surface side of said toe section and a light receiver arranged on the other surface side of said toe section in axial alignment with said light emitter, said light emitters being activated when the leading end of said toe section arrives at the positions of said light emitters within said detection area, said light receivers photoelectrically converting the incident beams of light from said light emitters into electric detection signals whose magnitudes corresponds to the intensity of said incident beams, and a control circuit electrically connected to said light receivers and enabled to compare beginning portions of the electric detection signals from said photoelectric sensors to generate an operation signal when any difference in magnitude between the electric detection signals is sensed.

2. Improved apparatus as claimed in claim 1 further comprising an additional photoelectric sensor arranged at a position outside the path of travel of said sew line, said additional photoelectric sensor including a light emitter arranged on one surface side of said toe section and a light receiver arranged on the other surface side of said toe section in axial alignment therewith, said last named light emitter being activated when said toe section travels through said detection area, said last named light receiver photoelectrically converting the incident beam of light from said last named light emitter into an electric detection signal whose magnitude corresponds to the intensity of said incident beam received, and a control circuit electrically connected to said last named light receiver to generate an operation signal when any decrease in magnitude of said last named electric detection signal is sensed.

3. Improved apparatus for detecting sewing defects on a stocking toe closer comprising, a housing having a region defining a detection area adapted to receive said stocking toe closer, a pair of photoelectric sensors arranged at spaced locations within said housing in alignment with the path of travel of the sew line on the toe section of a stocking passing through said detection area, each of said photoelectric sensors including a light emitter arranged on one surface side of said toe section and a light receiver arranged on the other surface side of said toe section in axial alignment with said light emitter, said light emitters rendered active when the leading end of said toe section arrives at the location of said light emitter within said detection area, said light receivers photoelectrically converting the incident beams of light emitted from said light emitters into electric detection signals whose magnitudes corresponds to the intensity of said incident beams passing through said sewing defect, a control circuit electrically connected to said pairs of photoelectric sensors and enable to compare the electric detection signals generated by said photoelectric sensors when said sensors are activated by said leading end of said toe section, said photoelectric sensors adapted to respond to the comparison of said electric detection signals by generating an operation signal when any difference in magnitude between said electric detection signals is sensed upon activation of said photoelectric sensors in the presence of a sewing defect.

4. Improved apparatus as claimed in claim 3 further comprising an additional photoelectric sensor arranged within said housing at a location outside the path of travel of said sew line, said additional photoelectric sensor including a light emitter arranged on one surface side of said toe section and a light receiver arranged on the other surface side of said toe section in axial alignment therewith, said last named light emitter being activated when said toe section travels through said detection area defined by said housing, said last named light receiver photoelectrically converting the incident beam of light from said last named light emitter into an electric detection signal whose magnitude corresponds to the intensity of said incident beam received, and a control circuit electrically connected to said last named light receiver to generate an operation signal when any decrease in magnitude of said last named detection signal is sensed.

5. Improved method for detecting sewing defects in the sew line of the toe section of a stocking toe closer, comprising the steps of applying two separate beams of equal intensity to the sew line on one surface side of the toe section at two different spaced positions along the path of travel of said sew line in a detection area when the leading end of the toe section of a closed stocking arrives at each point of beam emanation within the detection area, collecting said beams passing through said toe section separately from each other on the other surface side of said toe section, photoelectrically converting each collected beam into an electric detection signal whose magnitude corresponds to the intensity of each of said collected beams passing through said sew line and electrically comparing the beginning portions of the electric detection signals so obtained to generate an operation signal when any difference in magnitude between said electric detection signals is sensed.

6. Improved method as claimed in claim 5 further comprising the steps of applying a further beam to said toe section on one surface side thereof at a position outside said sew line when said toe section section travels through said detection area, collecting said further beams on the other side of said toe section, photoelectrically converting the last named collected beam into an electric detection signal whose magnitude corresponds to the intensity of said last named collected beam, and generating an operation signal when any difference in magnitude of said last named detection signal is sensed.

* * * * *